(12) United States Patent
Haaland et al.

(10) Patent No.: US 11,591,992 B2
(45) Date of Patent: Feb. 28, 2023

(54) ENGINE SYSTEM WITH AIR PUMP FOR ENHANCED TURBOCHARGER AIR EXCHANGE

(71) Applicant: Deere & Company, Moline, IL (US)

(72) Inventors: Eric J. Haaland, Waverly, IA (US); Pratir R. Punjani, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/308,331

(22) Filed: May 5, 2021

(65) Prior Publication Data
US 2022/0356858 A1 Nov. 10, 2022

(51) Int. Cl.
*F02M 26/08* (2016.01)
*F02M 35/10* (2006.01)
(Continued)

(52) U.S. Cl.
CPC .............. *F02M 26/08* (2016.02); *F01N 3/023* (2013.01); *F01N 3/2066* (2013.01); *F01N 3/22* (2013.01);
(Continued)

(58) Field of Classification Search
CPC ........ F02M 26/08; F02M 26/22; F02M 31/20; F02M 35/10157; F02M 35/10222;
(Continued)

(56) References Cited

U.S. PATENT DOCUMENTS 6,062,026 A 5/2000 Woollenweber et al.
6,138,649 A 10/2000 Khair et al.
(Continued)

FOREIGN PATENT DOCUMENTS

DE 9421145 U1 5/1995
DE 102006015390 A1 10/2007
(Continued)

OTHER PUBLICATIONS

USPTO Non-Final Office Action issued in Utility U.S. Appl. No. 17/237,876 dated Jan. 21, 2022.
(Continued)

*Primary Examiner* — Brandon D Lee
(74) *Attorney, Agent, or Firm* — Klintworth & Rozenblat IP LLP

(57) ABSTRACT

An engine system includes an internal combustion engine having an engine block with one or more piston-cylinder arrangements communicating with an intake manifold and an exhaust manifold, a charge air passageway to the intake manifold, and an exhaust gas passageway that receives exhaust gas from the exhaust manifold. The engine system also includes one or more turbochargers each including a compressor to compress charge air and output the compressed charge air to the charge air passageway and a turbine that receives exhaust gas from the exhaust gas passageway and drives the compressor in response to the exhaust gas passing through the turbine. An air pump is positioned downstream of the compressor that supplies a portion of the compressed charge air into the exhaust gas passageway upstream of the turbine, such that the turbine receives both exhaust gas and compressed charge air.

12 Claims, 4 Drawing Sheets

(51) Int. Cl.
    *F01N 13/10*     (2010.01)
    *F02B 37/16*     (2006.01)
    *F02M 26/22*     (2016.01)
    *F01N 3/023*     (2006.01)
    *F01N 3/20*     (2006.01)
    *F01N 3/22*     (2006.01)
    *F02M 31/20*     (2006.01)
    *F02B 29/04*     (2006.01)

(52) U.S. Cl.
    CPC ............ *F01N 13/10* (2013.01); *F02B 37/168* (2013.01); *F02M 26/22* (2016.02); *F02M 31/20* (2013.01); *F02M 35/10157* (2013.01); *F02M 35/10222* (2013.01); *F01N 2900/08* (2013.01); *F01N 2900/16* (2013.01); *F02B 29/04* (2013.01)

(58) Field of Classification Search
    CPC .......... F01N 3/023; F01N 3/2066; F01N 3/22; F01N 13/10; F01N 2900/08; F01N 2900/16; F02B 37/168; F02B 29/04
    See application file for complete search history.

(56) References Cited

U.S. PATENT DOCUMENTS

| | | |
|---|---|---|
| 6,647,724 B1 | 11/2003 | Arnold et al. |
| 8,176,736 B2 | 5/2012 | Janssen |
| 8,181,452 B2 | 5/2012 | Bidner et al. |
| 8,522,756 B2 | 9/2013 | Vuk et al. |
| 8,820,056 B2 | 9/2014 | VanDyne et al. |
| 9,347,365 B2 | 5/2016 | Hunter |
| 9,540,989 B2 | 1/2017 | Sanchez Perez et al. |
| 9,869,258 B2 | 1/2018 | Dion |
| 10,145,320 B1 | 12/2018 | Zeng et al. |
| 10,641,191 B2 | 5/2020 | Zeng et al. |
| 11,205,789 B2 | 12/2021 | Tanimoto |
| 2008/0092861 A1 | 4/2008 | Duffy et al. |
| 2009/0107142 A1 | 4/2009 | Russell et al. |
| 2010/0018203 A1 | 1/2010 | Richards |
| 2010/0146968 A1 | 6/2010 | Simpson et al. |
| 2011/0016862 A1 | 1/2011 | Song et al. |
| 2011/0209473 A1 | 9/2011 | Fritz et al. |
| 2013/0098030 A1* | 4/2013 | Freund .................. F02G 5/02 60/599 |
| 2013/0297126 A1 | 11/2013 | Yamazaki et al. |
| 2014/0109571 A1 | 4/2014 | Primus et al. |
| 2016/0010576 A1 | 1/2016 | Primus et al. |
| 2016/0265468 A1 | 9/2016 | Takayanagi et al. |
| 2019/0107066 A1* | 4/2019 | Kurtz .................... F02B 75/02 |
| 2019/0383244 A1 | 12/2019 | Kim |
| 2020/0011229 A1 | 1/2020 | Waldron et al. |
| 2020/0173354 A1 | 6/2020 | Punjani et al. |
| 2020/0309059 A1* | 10/2020 | Hotta .................... F02B 37/18 |
| 2021/0277849 A1* | 9/2021 | Rahm ................ F02D 41/0007 |
| 2022/0090566 A1 | 3/2022 | Magnusson et al. |
| 2022/0106919 A1* | 4/2022 | Carlen .................. F02M 26/34 |

FOREIGN PATENT DOCUMENTS

| | | |
|---|---|---|
| DE | 102009028925 A1 | 3/2011 |
| DE | 102011077148 A1 | 12/2012 |
| DE | 102012202857 A1 | 8/2013 |
| DE | 102015208418 A1 | 10/2016 |
| FR | 3024178 A1 | 1/2016 |
| FR | 3035151 A1 | 10/2016 |
| FR | 3035443 A1 | 10/2016 |
| FR | 3035444 A1 | 10/2016 |
| FR | 3036738 A1 | 12/2016 |
| FR | 3037616 A1 | 12/2016 |
| FR | 3051225 A1 | 11/2017 |
| FR | 3053397 A1 | 1/2018 |
| FR | 3054602 A1 | 2/2018 |
| GB | 804124 | 11/1958 |
| JP | 09268916 A1 | 10/1997 |
| JP | 2001073880 A1 | 3/2001 |
| JP | 2006057570 A | 3/2006 |
| JP | 4788531 B2 | 10/2011 |
| KR | 101999909 B1 | 7/2019 |
| RU | 2719758 C2 | 4/2020 |
| WO | 2013068800 A1 | 5/2013 |
| WO | 2013186373 A1 | 12/2013 |
| WO | 2019219701 A1 | 11/2019 |
| WO | 2020064679 A1 | 4/2020 |
| WO | 2021005613 A1 | 1/2021 |

OTHER PUBLICATIONS

USPTO Final Office Action issued in Utility U.S. Appl. No. 17/237,876 dated Mar. 8, 2022.
Garrett Advancing Motion, 48V Electric Compressor for Mild Hybrid Vehicles, © 2021 Garrett Motion Inc. (9 pages).
Eaton, Diesel Engine EGR Pump, Precision Air Flow, https://www.eaton.com/us/en-us/praducts/engine-solutions/superchargers/TVS-technology-applications/tvs-diesel-egr-pump.html, © 2021 Eaton. (5 pages).
Garrett Advancing Motion, E-Turbo Technology Accelerating Global Powertrain Electrification Trends Beginning with Mercedes—AMG, Media Pressroom—Press Releases, Jul. 22, 2020, © 2021 Garrett Motion Inc. (4 pages).
University Wisconsin, Electric Turbo Chargers, Overview of Forced Induction System, WEMPEC Electrification of FIS, EFIS Topologies, © Board of Regents of the University of Wisconsin System, Mar. 2016. (1 page).
Utility U.S. Appl. No. 17/237,876, filed Apr. 22, 2021.
Utility U.S. Appl. No. 17/306,604, filed May 3, 2021.
USPTO Non-Final Office Action issued in Utility U.S. Appl. No. 17/237,876 dated Aug. 31, 2021.
USPTO Non-Final Office Action issued in Utility U.S. Appl. No. 17/237,876 dated Aug. 16, 2022. (18 pages).
USPTO Final Office Action issued in Utility U.S. Appl. No. 17/358,587 dated Jul. 25, 2022. (17 pages).
USPTO Non-Final Office Action issued in Utility U.S. Appl. No. 17/306,604 dated Sep. 13, 2022. (13 pages).
USPTO Non-Final Office Action issued in Utility U.S. Appl. No. 17/406,656 dated Sep. 15, 2022. (16 pages).

\* cited by examiner

ENGINE SYSTEM WITH AIR PUMP FOR ENHANCED TURBOCHARGER AIR EXCHANGE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to internal combustion engines and, more particularly, to such engines systems having an air pump for providing increased air flow to a turbocharger.

BACKGROUND OF THE DISCLOSURE

An internal combustion engine may include one or more turbochargers that compress fluid that is supplied to combustion chambers within the engine. Each turbocharger typically includes a turbine and a compressor, with the turbine driven by exhaust gas from the engine and the compressor, in turn, being driven by the turbine. The compressor receives the fluid to be compressed, which may be in the form of air or a fuel and air mixture, and supplies the fluid to the combustion chambers. In operation of the engine at low speeds, the exhaust gas generated by the engine is reduced, and this reduced level of exhaust gas output by the engine can impact the driving of the turbine and reduce the rotational power generated thereby. The reduction of the rotational power generated by the turbine in turn reduces the volumetric flow rate of compressed fluid output from the turbocharger compressor that is driven by the turbine.

SUMMARY OF THE DISCLOSURE

An engine system includes an internal combustion engine having an engine block with one or more piston-cylinder arrangements communicating with an intake manifold and an exhaust manifold, a charge air passageway to the intake manifold, and an exhaust gas passageway that receives exhaust gas from the exhaust manifold. The engine system also includes a turbocharger assembly including one or more turbochargers, with each of the one or more turbochargers further including a compressor to compress charge air and output the compressed charge air to the charge air passageway and a turbine that receives the exhaust gas from the exhaust gas passageway and drives the compressor in response to the exhaust gas passing through the turbine. The engine system further includes an air pump downstream of the compressor that supplies a portion of the compressed charge air into the exhaust gas passageway upstream of the turbine, such that the turbine receives both the exhaust gas and the portion of the compressed charge air.

In another implementation, a method of manufacturing an engine system includes providing an internal combustion engine operable to cause combustion within one or more piston-cylinder arrangements in an engine block of the internal combustion engine and providing an exhaust manifold and an exhaust gas passageway that direct exhaust gas from the one or more piston-cylinder arrangements to a turbocharger assembly of the engine system, the turbocharger assembly including one or more turbochargers each having a turbine that drives a compressor to output a compressed charge air. The method also includes providing a charge air passageway to receive the compressed charge air and communicate the compressed charge air to an intake manifold of the internal combustion engine and providing an air pump operable to supply a portion of the compressed charge air into the exhaust gas passageway upstream of the turbocharger assembly, such that both the exhaust gas and the portion of the compressed charge air are passed through the turbine of each of the one or more turbochargers to drive operation thereof.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
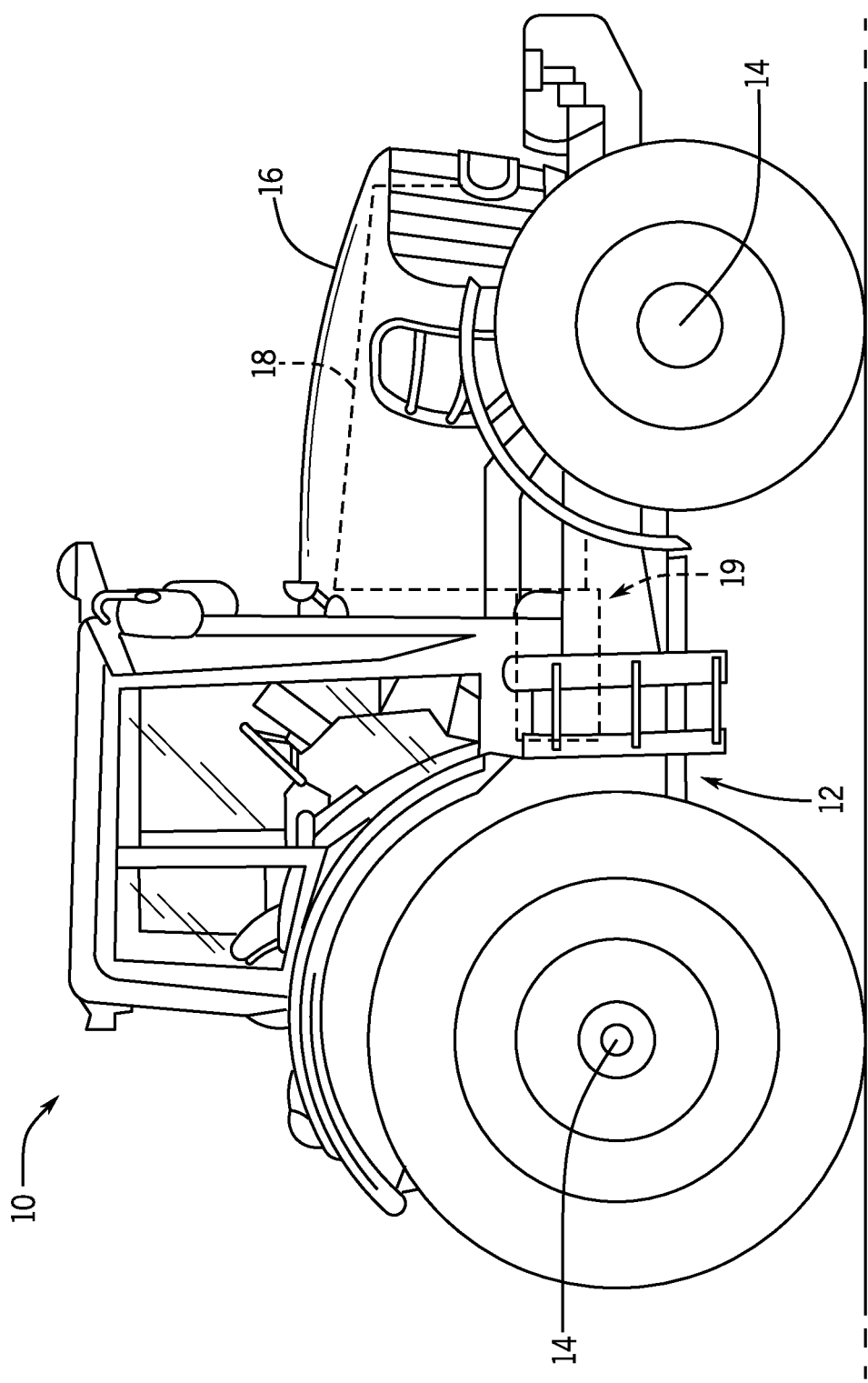
FIG. 1 is a simplified side view of an example work vehicle in which embodiments of the present disclosure may be implemented.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

As previously noted, internal combustion engines may include one or more turbochargers that compress air that is supplied to combustion chambers within the engine. In operation of the turbocharger(s), exhaust gas produced by the engine is used to drive a turbine of the turbocharger, with exhaust gas flowing through the turbine and causing it to rotate, thereby driving a compressor of the turbocharger such that the compressor forces air into the combustion chambers of the engine.

It is recognized that during start-up of an internal combustion engine or during operation thereof at a partial load, the amount of exhaust gas output by the engine (and energy contained therein) is reduced as compared to operation at a full load. This reduction in the amount of exhaust gas provided to the turbine can cause a corresponding drop in the compressor power that is output by the turbocharger for charging the engine cylinders. Without a sufficient supply of compressed air provided to the combustion chambers of the engine, the performance of the engine may be reduced, especially as the engine is operated at a higher load.

To address the issue of the turbocharger providing an insufficient flow of compressed charging air to the combustion chambers at low engine loads, some prior systems have utilized a separately driven charging pump that boosts performance of the turbocharger. The charging pump generates an additional flow of air that is directed into the turbine of the turbocharger to supplement the exhaust gas output from the engine. However, existing arrangements of such charging pumps are inefficient in the manner that they provide this additional airflow to the turbocharger turbine. That is, in operation the charging pump draws air from the ambient environment and pressurizes that air by a large amount for the ambient air output therefrom to match the pressure of the exhaust gas with which it is mixed. Operation of an air pump in this manner is not an optimal method for boosting turbocharger performance at low engine loads, due to inefficiencies in the pump operation and the costs associated with providing an air pump of a size sufficient to provide the necessary pressure change.

To provide for a more efficient inflow of air to the exhaust gas stream to boost turbocharger performance, an engine system is provided with an air pump that utilizes a stream of previously compressed air to supplement the exhaust gas output from the engine. The air pump is positioned downstream from the turbocharger compressor and in a parallel arrangement with the engine. The air pump receives a portion of the compressed air output from the turbocharger compressor and drives the compressed air into the stream of exhaust gas output from the engine, thereby supplementing the exhaust gas before it proceeds downstream to the turbocharger turbine. As the air pump receives air that has already been pressurized by the turbocharger compressor, less work is performed by the air pump in bringing the air to a desired pressure at which the fresh air can be injected into the stream of exhaust gas output from the engine.

In one implementation, the air pump draws compressed air from a charge air passageway downstream of the turbocharger compressor. The air pump is arranged in parallel with the engine such that compressed air drawn from the charge air passageway by the pump bypasses the engine. The compressed air drawn in by the air pump is driven or injected into the exhaust gas output from the engine, with the fresh air provided by the air pump being mixed with the exhaust gas upstream from the turbocharger turbine. An increased flow of air and exhaust gas may thus be provided to the turbine, thereby enhancing compressor flow generated by the turbocharger and improving engine performance.

In another implementation, the pump is provided as part of an exhaust gas recirculation (EGR) circuit in the engine system. The air pump is configured as a reversible pump that is selectively operable in an EGR mode and a fresh air mode. In the EGR mode of operation, the reversible pump recirculates a portion of the exhaust gas output from the exhaust side of the engine back to the induction side of the engine, where it is mixed with compressed fresh air and provided to the combustion chambers of the engine to boost engine performance. In the fresh air mode, the reversible pump draws compressed air from the charge air passageway and drives or injects the air into the exhaust gas output from the engine, with the fresh air provided by the reversible pump being mixed with the exhaust gas upstream from the turbocharger turbine. An increased flow of air and exhaust gas may thus be provided to the turbine, thereby enhancing compressor flow generated by the turbocharger and improving engine performance.

In one embodiment, separate flow passageways may be provided in the EGR system to direct air and exhaust gas flow based on the operational mode of the reversible pump. A valve is included in the EGR system that is actuatable to one of two positions to direct air and exhaust gas flows along one on the flow passageways. When the reversible pump is in the EGR mode of operation, the valve can be actuated to a first position to direct a flow of exhaust gas along a passageway having an EGR cooler thereon, to cool the exhaust gas prior to it being circulated back to the induction side of the engine. When the reversible pump is in the fresh air mode of operation, the valve can be actuated to a second position to direct a flow of compressed fresh air along a passageway that bypasses the EGR cooler on its way to being injected into the stream of exhaust gas output from the engine.

Example embodiments of an engine system having an air pump will now be described in conjunction with FIGS. 1-4 according to this disclosure. By way of non-limiting example, the following describes the engine system as including a turbocharger assembly that includes series-connected high pressure and low-pressure turbochargers for boosting airflow to an internal combustion engine. The following examples notwithstanding, engine systems having internal combustion engines and turbocharger assemblies of other constructions would also benefit from an air pump being incorporated therein according to aspects of the invention. It is therefore recognized that aspects of the invention are not meant to be limited only to the specific embodiments described hereafter.

Example Embodiment(s) of an Engine System with Air Pump for Enhanced Turbocharger Air Exchange According to embodiments, an engine system is disclosed that includes an air pump for enhancing air intake to a turbocharger turbine included in the engine system to boost performance and efficiency in the engine system. As will become apparent to those skilled in the art from the following description, the engine system finds particular applicability in compression ignition or spark ignition engines that are used in a work vehicle, and therefore the illustrative examples discussed herein utilize such an environment to aid in the understanding of the invention.

Referring initially to FIG. 1, a work vehicle 10 is shown that can implement embodiments of the invention. In the illustrated example, the work vehicle 10 is depicted as an agricultural tractor. It will be understood, however, that other configurations may be possible, including configurations with the work vehicle 10 as a different kind of tractor, a harvester, a log skidder, a grader, or one of various other work vehicle types. The work vehicle 10 includes a chassis or frame 12 carried on front and rear wheels 14. Positioned on a forward end region of the chassis 12 is a casing 16 within which is located an engine system 18. The engine system 18 provides power via an associated powertrain 20 to an output member (e.g., an output shaft, not shown) that, in turn, transmits power to axle(s) of the work vehicle 10 to provide propulsion thereto and/or to a power take-off shaft for powering an implement on or associated with the work vehicle 10, for example.

Figure 2:
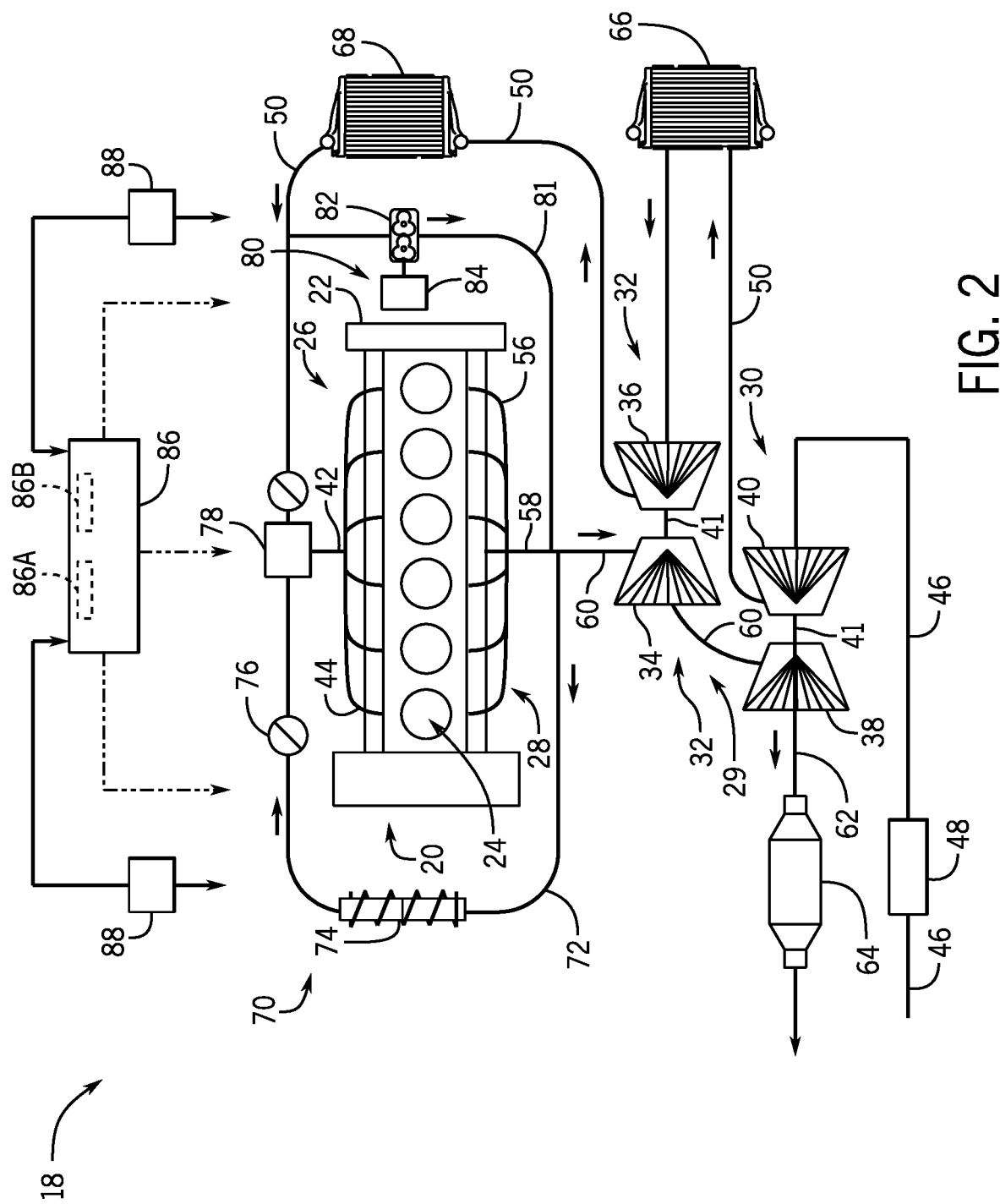
FIG. 2 is a schematic diagram of an example engine system having an air pump that provides an air flow boost to an intake of an engine turbocharger in accordance with an embodiment.

The engine system 18 is illustrated in greater detail in FIG. 2 in accordance with an example implementation. The engine system 18 includes an internal combustion engine 20

(hereafter, "engine") that, in different embodiments, may be a gasoline powered, diesel-powered, or alternative fuel powered engine. The engine 20 of the engine system 18 includes an engine block 22 having a plurality of combustion cylinders 24 therein within which pistons (not shown) reciprocate to cause combustion events. In the illustrated implementation, the engine 20 is an inline-6 (I-6) engine defining six combustion cylinders 24; however, in alternative implementations various engine styles and layouts may be used.

The engine system 18 also includes an intake manifold 26 fluidly connected to the engine 20, an exhaust manifold 28 fluidly connected to the engine 20, and a turbocharger assembly 29. In the illustrated embodiment, the turbocharger assembly 29 includes a pair of series-connected turbochargers 30, 32 fluidly connected to and in operable communication with the intake manifold 26 and the exhaust manifold 28, although it is recognized that in other embodiments the engine system 18 could instead include only a single turbocharger. As shown in FIG. 2, the turbocharger assembly 29 includes a low-pressure (LP) turbocharger 30 and a high-pressure (HP) turbocharger 32 arranged in series—with each of the turbochargers 30, 32 including a turbine 34, 38 and a compressor 36, 40 mechanically connected via a rotatable shaft 41. In operation of each of the turbochargers 30, 32, exhaust gas flowing through the turbine 34, 38 causes the turbine to rotate, thereby causing the shaft 41 to rotate. Rotation of the shaft 41, in turn, causes the compressor 36, 40, to also rotate, which draws additional air into the compressors 36, 40 to thereby increase the flow rate of air to the intake manifold 26 above what it would otherwise be without the turbochargers 30, 32, and in this manner the turbochargers 30, 32 supply so-called "charge" air to the engine 20.

As indicated, the HP and LP turbochargers 32, 30 are arranged in series with one another. The HP turbocharger 32 features a turbine 34 (HP turbine) for receiving exhaust gas from the exhaust manifold 28, and a compressor 36 (HP compressor) coupled to the HP turbine 34 for delivering pressurized air to the intake manifold 26 for combustion. The LP turbocharger 30 features a turbine 38 (LP turbine) for receiving exhaust gas from the HP turbine 34, and a compressor 40 (LP compressor) coupled to the LP turbine 38 for delivering pressurized air to the HP compressor 36 for further pressurization. Both the LP and HP turbochargers 30, 32 function to recover a portion of heat energy from the exhaust gas with their respective turbines 34, 38, to drive their respective compressors 36, 40 and thereby increase the amount of charge air delivered to the engine 20 for combustion.

As shown in FIG. 2, the intake manifold 26 includes a main intake 42 and a plurality of secondary pipes 44, with each of the secondary pipes 44 in fluid communication with a corresponding piston-cylinder arrangement 24 to direct a supply of air thereto. Fresh air is provided to the intake manifold 26 from the ambient environment via a fresh air intake passageway 46. Fresh air is drawn into the fresh air intake passageway 46, passed through an air filter 48 disposed in-line with the fresh air intake passageway 46, and provided to the LP compressor 40. The LP compressor 40 performs a first compression to the fresh air and provides it to the HP compressor 36 via a charge air passageway 50. The charge air passageway 50 then runs from the HP compressor 36 to the intake manifold 26 to provide compressed charge air from the HP compressor 36 to the intake manifold 26.

The exhaust manifold 28 of the engine system 18 includes a plurality of secondary pipes 56, each in fluid communication with a corresponding piston-cylinder arrangement 24, that direct exhaust gases generated by the engine 20 to a main outlet 58. The exhaust manifold 28 is fluidly coupled to inlets of the turbines 34, 38 of the turbochargers 30, 32 via an exhaust gas passageway 60, with fluid outlets of the turbines 34, 38 then fluidly coupled to the ambient environment via a vent passageway 62. Exhaust gas produced by the engine 20 is directed out from the exhaust manifold 28 and passes through the exhaust gas passageway 60 to the turbines 34, 38, with the exhaust gas then exiting the turbines 34, 38 to the ambient environment via the vent passageway 62 in a conventional manner. An aftertreatment system 64 may be disposed in-line with the vent passageway 62 to treat the exhaust gas prior to the exhaust gas being vented to ambient, such as by performing a diesel oxidation catalyzation, diesel particulate filtration (DPF) regeneration, or selective catalyst reduction, for example.

In an example implementation of the engine system 18, a pair of charge air coolers is positioned in-line with the charge air passageway 50 that function to reduce the temperature of the charge air prior to it being provided to the engine 20, so as to increase the unit mass per unit volume (i.e., density) of the charge air for improved volumetric efficiency. The charge air coolers include an aftercooler 68 positioned downstream from the HP compressor 36 that removes waste heat from the second stage of compression performed by the HP compressor 36 to reduce the temperature of the charge air and provide a denser intake charge to the engine 20 to allow more air and fuel to be combusted per engine cycle, increasing the output of the engine 20. The charge air coolers may also optionally include an intercooler 66 positioned between the LP compressor 40 and HP compressor 36 that removes waste heat from the first stage of compression performed by the LP compressor 40 to densify the charge air and thereby allow the HP compressor 36 to subsequently produce more work from its fixed compression ratio. According to an example implementation, the intercooler 66 and aftercooler 68 are configured as air-air heat exchangers that reject the waste heat generated from compression using ambient air flowing through the heat exchanger. However, in an alternate implementation, the intercooler 66 and aftercooler 68 could instead be configured as liquid-air heat exchangers that transfer waste heat from the charge air to an intermediate liquid (e.g., water), which finally rejects the heat to the ambient air.

An exhaust gas recirculation (EGR) system 70 is further provided in the engine system 18 that functions to recirculate a portion of the exhaust gas generated by the engine 20 and thereby reduce the formation of NOx during combustion. Exhaust gas is drawn from the exhaust manifold 28 and recirculated into the intake manifold 26 via the EGR system 70. The EGR system 70 includes an EGR passageway 72, an EGR cooler 74, an EGR valve 76, and an EGR mixer 78. The EGR passageway 72 draws in a portion of the exhaust gas that is flowing within the exhaust gas passageway 60 for circulation through the EGR system 70. The EGR cooler 74 is disposed in-line with the EGR passageway 72 for the purpose of cooling the exhaust gas flowing through the EGR passageway 72 and, in one implementation, is configured as liquid-air heat exchanger that transfers heat from the exhaust gas to an intermediate liquid (e.g., water), which finally rejects the heat to the ambient air.

The EGR valve 76 is disposed in-line with the EGR passageway 72 between the EGR cooler 74 and the EGR mixer 78. In another embodiment, the EGR valve 76 can be placed upstream of the EGR cooler 74. In one embodiment, the EGR valve 76 may operate based off a pressure ratio on opposing sides thereof, i.e., of the exhaust gas on one side and the charge air on the other side, with exhaust gas flowing therethrough when the pressure of the exhaust gas is higher than that of the charge air. In another embodiment, the EGR valve may be electrically controlled to selectively control the flow of exhaust gas therethrough, including cutting off the flow of exhaust gas therethrough and selectively restricting or controlling the flow of exhaust gas therethrough by a desired amount. Exhaust gas that flows through the EGR valve 76 is provided to the EGR mixer 78, which intermixes the exhaust gas with the charge air provided from the charge air passageway 50 for introduction to the intake manifold 26, by which the mixed exhaust gas and charge air is then fed to the engine 20.

As shown in FIG. 2, the engine system 18 further includes an air pump 80 mounted to or integral with an air pump passageway 81 that is fluidly coupled at one end to the charge air passageway 50 and at its opposite end to the exhaust gas passageway 60, with the air pump passageway 81 providing a bypass path around the engine 20. In one example, the air pump 80 is constructed to include a compressor 82 driven by an electric motor 84. The air pump 80 may be a positive-displacement type compressor capable of delivering physically metered air flowrates, such as a scroll or vane compressor or, alternatively, the pump 80 may be a radial-type compressor similar to a turbocharger compressor. In one example, the electric motor 84 of the air pump 80 operates as part of a 48-volt system on which the engine system 18 operates.

The electric air pump 80 is operable, when enabled, to pump a portion of the compressed charge air flowing within charge air passageway 50 into the exhaust gas passageway 60, while bypassing the engine 20, such that charge air is introduced into the exhaust gas output by the engine 20. This compressed charge air output from the air pump 80 is thus mixed with the exhaust gas to provide an increased fluid flow to the inlet of the turbines 34, 38 for the purpose of selectively increasing the flow rate of air supplied to the turbochargers 30, 32. Because the flow rate of compressed charge air output from the turbochargers 30, 32 is directly proportional to the rotational speed at which the turbines 34, 38 drive the compressors 36, 40 (via the drive shaft 41), it is desirable to increase the flow rate of gases provided to each of the turbines 34, 38 of the turbochargers 30, 32. The electric air pump 80 operates to provide such an increased flow rate by adding compressed charge air into the stream of exhaust gas output from the engine 20 that typically drives the turbines 34, 38. With the addition of compressed charge air into the stream of exhaust gas output from the engine 20, the turbines 34, 38 can thus be brought up to a high operating speed in a timely manner and therefore also drive the compressors 36, 40 at a high speed, thereby enabling the turbochargers 30, 32 to boost charge pressure very quickly within the charge air passageway 50 as a result of the increased air flow output from the compressors 36, 40. The flow rate of fresh compressed charge air to the engine 20 may thus be quickly increased to meet requirements during transient operating conditions of the engine 20, such as when ramping or spooling up from a low speed or low load for example. Additionally, compressed charge air can be added by the air pump 80 into the stream of exhaust gas output from the engine 20 during steady state operations of the engine 20.

In the illustrated embodiment, the engine system 18 further includes a controller 86 to control operation of the air pump 80 and, in some embodiments, the controller 86 may be provided as an engine control unit (ECU) operable to also control overall operation of the engine system 18, including the engine 20 (e.g., actuators, valves, etc. on/in the engine), turbochargers 30, 32, and the EGR valve 76, for example. The controller 86 may be configured as one or more computing devices with associated processor devices 86(*a*) and memory architectures 86(*b*) and, as such, the controller 86 may be configured to execute various computational and control functionality with respect to the engine system 18 as described herein.

The controller 86 receives inputs from sensors 88 and other input devices associated with the engine system 18 and processes these inputs to determine corresponding engine system 18 operating parameters. Examples of such sensors 88 that may be included with the engine system 18 and its associated operating parameters include, but are not limited to, any one or combination of a speed sensor configured to produce a signal corresponding to rotational speed of the engine 20, a boost pressure sensor configured to produce a signal corresponding to charge air pressure within the charge air passageway 50 and intake manifold 26, a temperature sensor configured to produce a temperature signal corresponding to the temperature of charge air within the charge air passageway 50 and intake manifold 26, an exhaust gas pressure sensor configured to produce a signal corresponding to exhaust gas pressure within the exhaust manifold 28 and exhaust gas passageway 60, an exhaust gas temperature sensor configured to produce a signal corresponding to the temperature of exhaust gas produced by the engine 20, and a speed sensor configured to produce a signal corresponding to a rotational speed of the rotatable shaft 41 of each of the turbocharger(s) 30, 32. Additional sensors 88 could include a pressure sensor configured to produce a signal corresponding to the pressure on the EGR passageway 72 or across the EGR valve 76 and a temperature sensor configured to produce a temperature signal corresponding to the temperature of recirculated exhaust gas flowing through the EGR passageway 72, for example. Still further, additional inputs may be provided to the controller 86 via operator controls of the vehicle 10, including commands to increase the speed of the engine 20, for example.

Responsive to inputs received thereby, the controller 86 outputs control signals to one or more components in the engine system 18 to control operation thereof. Thus, as one example, the controller 86 may receive an input signal indicating that an operator desires to increase the engine speed and input signals from various sensors 88 on the induction side manifold pressure and temperature, exhaust side manifold pressure and temperature, and turbocharger speed. Responsive to these inputs, the controller 86 may then modify operation of the air pump 80 to increase the amount/rate of compressed charge air that is supplied by the air pump 80 into the exhaust gas passageway 60, thereby boosting the air inflow to the turbines 34, 38 and increasing the rotational speed thereof and correspondingly driving the compressors 36, 40 at an increased speed to boost the supply of compressed charge air provided to the engine 20. The controller 86 may also output an EGR valve control signal that controls the position of the EGR valve 76 relative to a reference position, e.g., relative to a fully open or fully closed position, to thereby control the flow rate of recirculated exhaust gas through the EGR passageway 72.

Figure 3:
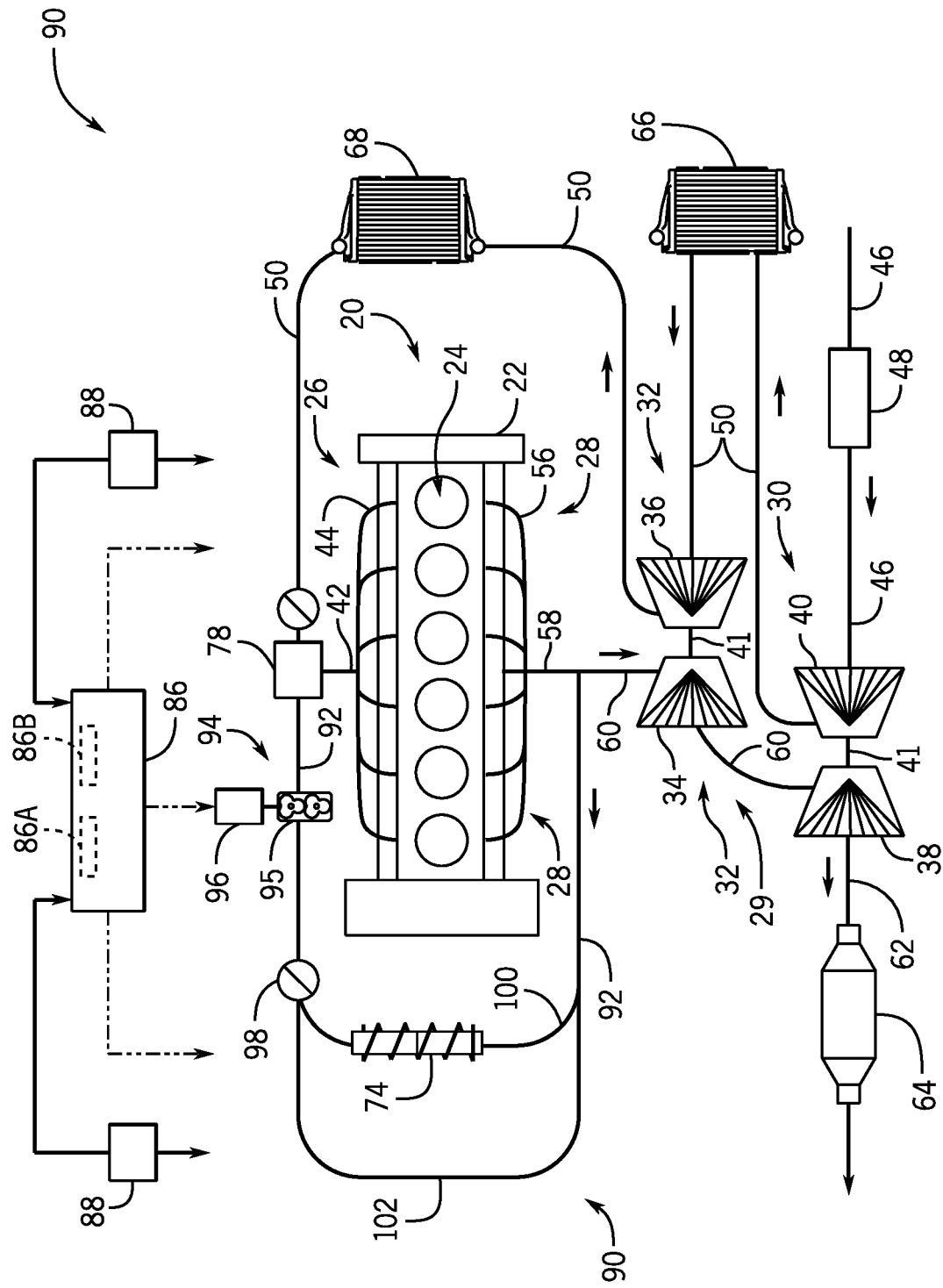
FIG. 3 is a schematic diagram of an example engine system having an air pump that provides an air flow boost to an intake of an engine turbocharger in accordance with an embodiment.

Referring now to FIG. 3, an engine system 90 is illustrated according to another embodiment. The engine system 90 includes many common components as the engine system 18 of FIG. 2, and thus common components of the system are identified consistent with those in FIG. 2. In the engine system 90, the engine 20 is provided with charge air from a turbocharger assembly 29 that includes an LP turbocharger 30 and a HP turbocharger 32 to boost performance of the engine 20. Fresh air is drawn from the ambient environment through the fresh air intake passageway 46 and provided to the LP compressor 40. The LP compressor 40 performs a first compression to the fresh air, which is then passed through the intercooler 66 and provided to the HP compressor 36. The compressed charge air that is output from the HP compressor 36 is provided to the charge air passageway 50 and is passed through the aftercooler 68 before being supplied to the intake manifold 26 for feeding into the combustion cylinders 24 in the engine 20.

Exhaust gas produced by the engine 20 during operation thereof is directed into the exhaust manifold 28 and is subsequently passed into the exhaust gas passageway 60. The exhaust gas is then directed to the turbocharger assembly 29, with the HP turbine 34 receiving exhaust gas from the exhaust gas passageway 60. Exhaust gas passes through the HP turbine 34 (to drive rotation of shaft 41 and, in turn, drive the HP compressor 36) and then onto the LP turbine 38 (again driving rotation of shaft 41 and, in turn, driving the LP compressor 40) before being treated by the exhaust treatment device 64 and being vented to the ambient environment via the vent passageway 62. A portion of the exhaust gas produced by the engine may also be recirculated from the exhaust gas passageway 60 into the intake manifold 26 via an EGR system 92. The EGR system 92 includes an EGR passageway 92 fluidly coupled between the exhaust gas passageway 60 and the charge air passageway 50 or intake manifold 26. Under some operating conditions of the engine 20, compressed charge air supplied to the intake manifold 26 of the engine 20 by the turbocharger assembly 29 may have recirculated exhaust gas mixed in therewith that is provided through the EGR passageway 92 and an EGR mixer 78 to the intake manifold 26.

As shown in FIG. 3, the engine system 90 further includes an air pump 94 positioned in-line with the EGR passageway 92, with the air pump 94 including—according to one example—a compressor 95 driven by an electric motor 96. The air pump 94 is configured as a reversible pump (hereinafter "reversible pump 94"), such as a roots pump for example, that is operable in two different modes—a fresh air mode and an EGR mode—with the reversible pump 94 being electrically controlled to selectively control the mode of operation thereof. In the EGR mode, the reversible pump 94 operates to recirculate a portion of the exhaust gas from the exhaust gas passageway 60 into the intake manifold 26, with the exhaust gas mixed with the compressed charge air provided by the charge air passageway 50 in the EGR mixer 78 for feeding to the engine 20. In the fresh air mode, the reversible pump 94 operates in reverse from the EGR mode to pump a portion of the compressed charge air flowing from charge air passageway 50 (into the intake manifold 26) through the EGR passageway 92 and into the exhaust gas passageway 60, while bypassing the engine 20, such that charge air is introduced into the exhaust gas output by the engine 20. This compressed charge air output from the reversible pump 94 is thus mixed with the exhaust gas to provide an increased fluid flow to the inlet of the turbines 34, 38 for the purpose of selectively increasing the flow rate of gas supplied to the turbochargers 30, 32. Because the flow rate of compressed charge air output from the turbochargers 30, 32 is directly proportional to the rotational speed at which the turbines 34, 38 drive the compressors 36, 40 (via the drive shaft 41), it is desirable to increase the flow rate of gases provided to each of the turbines 34, 38 of the turbochargers 30, 32. The reversible pump 94 operates to provide such an increased flow rate by adding compressed charge air into the stream of exhaust gas output from the engine 20 that typically drives the turbines 34, 38. With the addition of compressed charge air into the stream of exhaust gas output from the engine 20, the turbines 34, 38 can thus be brought up to a high operating speed in a timely manner and therefore also drive the compressors 36, 40 at a high speed, thereby enabling the turbochargers 30, 32 to boost charge pressure very quickly within the charge air passageway 50 as a result of the increased air flow output from the compressors 36, 40. The flow rate of fresh compressed charge air provided to the engine 20 may thus be quickly increased to meet requirements during transient operating conditions of the engine 20, such as when ramping or spooling up from a low speed or low load for example.

In one implementation, and as shown in FIG. 3, a directional valve 98 is disposed in-line with the EGR passageway 92 between the EGR cooler 74 and the reversible pump 94. More specifically, the directional valve 98 is positioned at a location where the EGR passageway 92 splits into a cooler passageway 100 (on which the EGR cooler 74 is positioned) and a cooler bypass passageway 102 that runs in parallel with the cooler passageway 100. The directional valve 98 may be electrically controlled in conjunction with the reversible pump 94 such that the directional valve 98 is moveable to a first position that fluidly connects the EGR passageway 92 and the reversible pump 94 with the cooler passageway 100 and a second position that fluidly connects the EGR passageway 92 and the reversible pump 94 with the cooler bypass passageway 102.

When the reversible pump 94 is operating in the EGR mode, the directional valve 98 is actuated to the first position to provide a flow path through the EGR system 92 where a portion of the exhaust gas enters from the exhaust gas passageway 60 into the EGR passageway 92, proceeds along the cooler passageway 100 and through the EGR cooler 74, and then flows through the directional valve 98 and to the reversible pump 94, which functions to provide the exhaust gas to the EGR mixer 78 for mixing with the compressed charge air before being fed to the intake manifold 26 and engine 20. In another implementation, the directional valve 98 may be actuated to the second position while the reversible pump 94 is operating in the EGR mode, such that exhaust gas flows through the cooler bypass passageway 102 and is routed around the EGR cooler 74, with such control of the directional valve 98 potentially being implemented during a low load engine operating condition.

When the reversible pump 94 is operating in the fresh air mode, the directional valve 98 is actuated to the second position to provide a flow path through the EGR system 92 where a portion of the compressed charge air enters from the charge air passageway 50, passes through the EGR mixer 78 into the EGR passageway 92, and is fed into the reversible pump 94. The reversible pump 94 outputs a flow of compressed charge air therefrom that proceeds along the EGR passageway 92 and through the directional valve 98, with the directional valve directing the flow of charge air along the cooler bypass passageway 102 (bypassing the EGR cooler 74), before the compressed charge air then rejoins the main EGR passageway 92 and flows into the exhaust gas passageway 60.

As previously described with respect to the embodiment of FIG. 2, a controller 86 is included in the engine system 90 to control operation of the reversible pump 94 and overall operation of the engine system 18, including the engine 20 (e.g., actuators, valves, etc. on/in the engine), turbochargers 30, 32, and the directional valve 98, for example. The controller 86 may receive inputs from sensors 88 and other input devices associated with the engine system 18, such as an engine speed, fuel flow, induction side manifold pressure and temperature, exhaust side manifold pressure and temperature, and turbocharger speed, as previously described. Responsive to the received inputs, the controller 86 outputs control signals to one or more components in the engine system 90 to control operation thereof. As one example of controller operation, the controller 86 may control operation of the reversible pump 94 to modify the operational mode thereof (EGR mode or fresh air mode) and control the amount/rate of exhaust gas or compressed charge air output therefrom responsive to received input(s), such as fuel flow, induction side manifold pressure and temperature, exhaust side manifold pressure and temperature, and turbocharger speed, as examples. If the controller 86 causes the reversible pump 94 to operate in the EGR mode, the reversible pump 94 may be operated to control a flow of exhaust gas that is recirculated from the exhaust gas passageway 60 into the intake manifold 26, with the exhaust gas mixed in with the compressed charge air provided by the charge air passageway 50 and then fed to the engine 20. With the reversible pump 94 being operated in the EGR mode, the controller 86 also causes the directional valve 98 to operate in the first position so that the exhaust gas recirculated by the EGR system 92 is directed through the EGR cooler 74 via cooler passageway 100. If the controller 86 causes the reversible pump 94 to operate in the fresh air mode, the reversible pump 94 may be operated to control a flow of compressed charge air into the exhaust gas passageway 60, thereby boosting the air inflow to the turbines 34, 38 and increasing the rotational speed thereof and correspondingly driving the compressors 36, 40 at an increased speed to boost the supply of compressed charge air provided to the engine 20. With the reversible pump 94 being operated in the fresh air mode, the controller 86 also causes the directional valve 98 to operate in the second position so that the exhaust gas recirculated by the EGR system 92 is bypasses the EGR cooler 74 via cooler bypass passageway 102.

Figure 4:
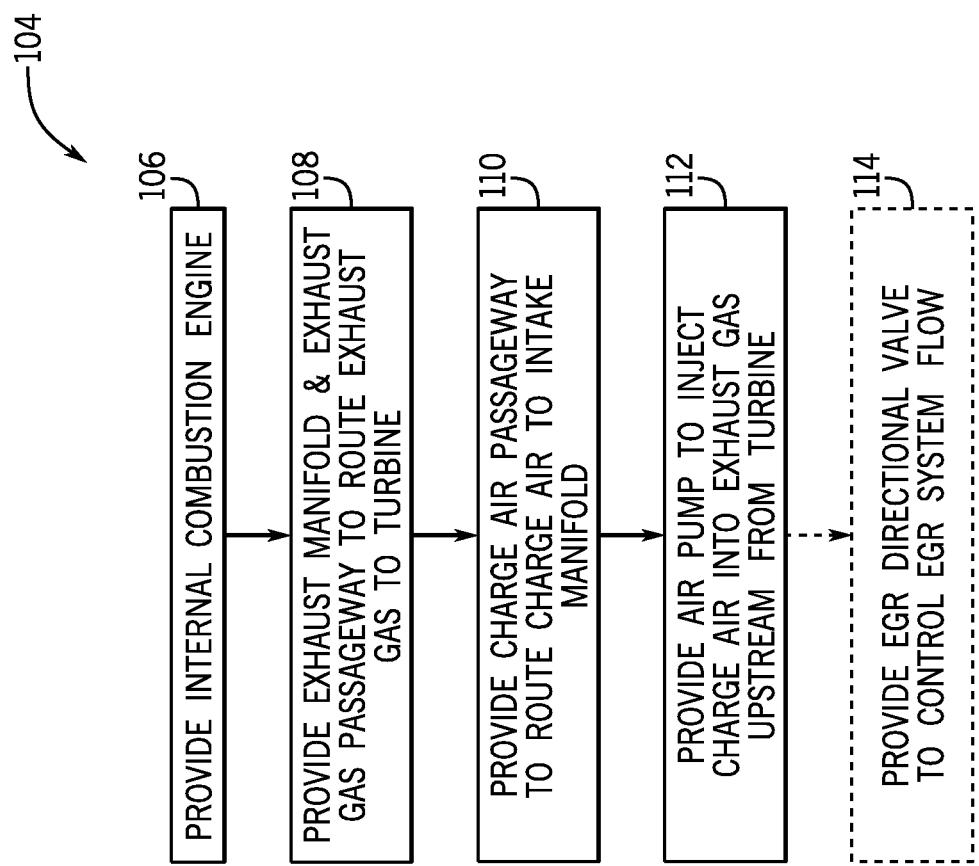
FIG. 4 is a flowchart of an example method of manufacturing an engine system in accordance with an embodiment.

Referring now to FIG. 4, and with continued reference to FIGS. 2 and 3, a flowchart of a method 104 for manufacturing an engine system 18, 88 is provided in accordance with the present disclosure. The method 104 begins at step 106 with an engine 20 being provided that is to cause combustion within the piston-cylinder arrangements 24 of an engine block 22 of the engine 20. At step 108, an exhaust manifold 28 and exhaust gas passageway 60 are provided that direct exhaust gas from the piston-cylinder arrangements 22 to a turbocharger assembly 29 of the engine system 18. The turbocharger assembly 29 includes turbochargers 30, 32 each having a turbine 34, 38 that drives a compressor 36, 40 to output a compressed charge air. At step 110, a charge air passageway 50 is provided to receive the compressed charge air from the compressors 36, 40 and communicate the compressed charge air to an intake manifold 26 of the engine 20. An air pump 76, 96 is provided at step 112 that is operable to supply a portion of the compressed charge air into the exhaust gas passageway 60 upstream of the turbocharger assembly 29 (i.e., upstream of the turbines 34, 38), such that both the exhaust gas and the compressed charge air are passed through the turbines 34, 38 to drive operation thereof.

According to one implementation, the air pump provided at step 112 may be a dedicated fresh air pump 80 that is positioned on an air pump passageway 81 running between the charge air passageway 50 and the exhaust gas passageway 60, in a parallel arrangement to the engine 20. The air pump 80 may divert compressed charge air off from the charge air passageway 50, at a location upstream from the intake manifold 26 and control the amount/rate of compressed charge air that is supplied into the exhaust gas passageway 60, thereby boosting the air inflow to the turbines 34, 38 and increasing the rotational speed thereof and correspondingly driving the compressors 36, 40 at an increased speed to boost the supply of compressed charge air provided to the engine 20.

According to another implementation, the air pump provided at step 112 may be a reversible pump 94 that is positioned on an EGR passageway 92 extending between the exhaust gas passageway 60 and the intake manifold 26, as part of an EGR system 92. The reversible pump 94 is operable in forward and reverse modes—i.e., an EGR mode and fresh air mode—to selectively exchange exhaust gas or compressed fresh air between the induction and exhaust sides of the engine. In the EGR mode, the reversible pump 94 controls a flow of exhaust gas that is recirculated from the exhaust gas passageway 60 into the intake manifold 26, with the exhaust gas mixed in with the compressed charge air provided by the charge air passageway 50 and then fed to the engine 20. In the fresh air mode, the reversible pump 94 may be operated to control a flow of compressed charge air into the exhaust gas passageway 60, thereby boosting the air inflow to the turbines 34, 38 and increasing the rotational speed thereof and correspondingly driving the compressors 36, 40 at an increased speed to boost the supply of compressed charge air provided to the engine 20.

In an implementation where a reversible pump 94 is provided at step 112, the method can further include providing a directional valve 98 in the EGR passageway 92 to selectively route compressed charge air and exhaust gas through or around an EGR cooler 74 included in the EGR system 92, as indicated in phantom at step 114. The directional valve 98 is actuatable to a first position that routes exhaust gas recirculated from the exhaust gas passageway 60 to the intake manifold 26 through the EGR cooler 74 and is actuatable to a second position that routes compressed charge air that is supplied into the exhaust gas passageway 60 around the EGR cooler 74.

Desirably, embodiments of the engine system described herein provide an efficient means by which to boost turbocharger performance. For driving the turbine(s) of the turbocharger assembly in the engine system, an air pump is provided in the engine system that utilizes a stream of previously compressed charge air output from the turbocharger assembly to supplement the exhaust gas produced by the engine, with this mixture of compressed charge air and exhaust gas provided to the turbine(s). The air pump is positioned downstream from the turbocharger compressor(s) and in a parallel arrangement with the engine to receive a portion of the compressed air output from the turbocharger compressor(s). The air pump drives this portion of compressed charge air into the stream of exhaust gas produced from the engine, thereby supplementing the exhaust gas before it proceeds downstream to the turbocharger turbine (s). As the air pump receives air that has already been pressurized by the turbocharger compressor, less work is performed by the air pump in bringing the air to a desired pressure at which the fresh air can be injected into the stream of exhaust gas output from the engine, thereby providing improved efficiency in the engine system.

Additionally, by injecting an oxygen-rich stream of compressed charge air into the exhaust gas stream, embodiments of the engine system described herein provide improved treatment of exhaust gas. That is, the stream of fresh air (oxygen) introduced to the exhaust gas stream by the air pump can support increased efficiency and effectiveness for diesel oxidation catalyzation, diesel particulate filtration (DPF) regeneration, or selective catalyst reduction that is performed on the exhaust gas by the engine system, prior to the exhaust gas being vented to the ambient environment.

ENUMERATED EXAMPLES

The following examples are provided, which are numbered for ease of reference.

1. An engine system includes an internal combustion engine having an engine block with one or more piston-cylinder arrangements communicating with an intake manifold and an exhaust manifold, a charge air passageway to the intake manifold, and an exhaust gas passageway that receives exhaust gas from the exhaust manifold. The engine system also includes a turbocharger assembly including one or more turbochargers, with each of the one or more turbochargers further including a compressor to compress charge air and output the compressed charge air to the charge air passageway, and a turbine that receives the exhaust gas from the exhaust gas passageway and drives the compressor in response to the exhaust gas passing through the turbine. The engine system further includes an air pump downstream of the compressor that supplies a portion of the compressed charge air into the exhaust gas passageway upstream of the turbine, such that the turbine receives both the exhaust gas and the portion of the compressed charge air.

2. The engine system of example 1, wherein the portion of the compressed charge air supplied by the air pump into the exhaust gas passageway bypasses the internal combustion engine.

3. The engine system of example 2, wherein the air pump is positioned on an air pump passageway extending between the charge air passageway and the exhaust gas passageway and that bypasses the internal combustion engine, the charge air passageway positioned upstream from the intake manifold.

4. The engine system of example 1, further including an EGR system that recirculates a portion of the exhaust gas from the exhaust gas passageway back to the intake manifold to mix the portion of the exhaust gas with the compressed charge air, with the EGR system further including an EGR passageway extending between the exhaust gas passageway and the intake manifold and an EGR cooler operable to cool the portion of the exhaust gas flowing through the EGR passageway for providing to the intake manifold.

5. The engine system of claim 4, wherein the air pump is a reversible pump positioned on the EGR passageway, with the reversible pump configured to operate in an EGR mode to recirculate the portion of the exhaust gas from the exhaust gas passageway to the intake manifold and operate in a fresh air mode to supply the portion of the compressed charge air into the exhaust gas passageway.

6. The engine system of example 5, wherein the EGR passageway incudes a cooler passageway having the EGR cooler thereon and a cooler bypass passageway in parallel with the cooler passageway.

7. The engine system of example 6, wherein the EGR system further includes a directional valve moveable between a first position that fluidly connects the reversible pump with the cooler passageway and a second position that fluidly connects the reversible pump with the cooler bypass passageway, and wherein the directional valve is actuated to the first position when the reversible pump is operating in the EGR mode and is actuated to the second position when the reversible pump is operating in the fresh air mode 8. The engine system of example 1, further including a controller operably connected to the air pump, the controller configured to selectively operate the air pump to control the portion of the compressed charge air supplied into the exhaust gas passageway, with the controller selectively operating the air pump as a function of at least one of engine speed, fuel flow, intake manifold pressure and temperature, exhaust manifold pressure and temperature, or turbocharger speed.

9. The engine system of example 8, wherein the controller is configured to monitor a load condition of the internal combustion engine and operate the air pump to supply the portion of the compressed charge air into the exhaust gas passageway during steady state operations and the transition of the internal combustion engine from a low load condition to a higher load condition.

10. The engine system of example 1, further including an aftercooler downstream of the compressor, wherein the air pump receives the portion of the compressed charge air after if passes through the aftercooler.

11. The engine system of example 1, wherein the one or more turbochargers includes a high-pressure turbocharger and a low-pressure turbocharger, wherein the turbine of the high-pressure turbocharger receives the exhaust gas from the exhaust gas passageway and the portion of the compressed charge air from the air pump and the compressor of the high-pressure turbocharger outputs the compressed charge air into the charge air passageway and wherein the turbine of the low-pressure turbocharger receives an exhaust gas from the turbine of the high-pressure turbocharger and the compressor of the low-pressure turbocharger delivers intake air to the compressor of the high-pressure turbocharger.

12. A method of manufacturing an engine system includes providing an internal combustion engine operable to cause combustion within one or more piston-cylinder arrangements in an engine block of the internal combustion engine and providing an exhaust manifold and an exhaust gas passageway that direct exhaust gas from the one or more piston-cylinder arrangements to a turbocharger assembly of the engine system, the turbocharger assembly including one or more turbochargers each having a turbine that drives a compressor to output a compressed charge air. The method also includes providing a charge air passageway to receive the compressed charge air and communicate the compressed charge air to an intake manifold of the internal combustion engine and providing an air pump operable to supply a portion of the compressed charge air into the exhaust gas passageway upstream of the turbocharger assembly, such that both the exhaust gas and the portion of the compressed charge air are passed through the turbine of each of the one or more turbochargers to drive operation thereof.

13. The method of example 12, wherein the portion of the compressed charge air supplied by the air pump into the exhaust gas passageway bypasses the internal combustion engine.

14. The method of example 12, including positioning the air pump along an air pump passageway that is connected to the charge air passageway at a location upstream from the intake manifold.

15. The method of example 12, including positioning the air pump on an EGR passageway extending between the exhaust gas passageway and the intake manifold and wherein the air pump is operable as a reversible pump to selectively supply the portion of the compressed charge air into the exhaust gas passageway upstream of the turbine when operating in a fresh air mode and recirculate a portion of the exhaust gas from the exhaust gas passageway to the intake manifold when operating in an EGR mode.

CONCLUSION

The foregoing has thus provided an engine system that facilitates an exchange of fresh air between the intake side and exhaust side of the engine to boost turbocharger performance in the engine system. An air pump is provided in the engine system that utilizes a stream of previously compressed air to supplement the exhaust gas output from the engine for purposes of driving the turbocharger turbine. The air pump is positioned downstream from the turbocharger compressor and in a parallel arrangement with the engine, with the air pump receiving a portion of the compressed air output from the turbocharger compressor and driving the compressed air into the stream of exhaust gas output from the engine, thereby supplementing the exhaust gas before it proceeds downstream to the turbocharger turbine.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:
1. An engine system comprising:
an internal combustion engine including an engine block having one or more piston-cylinder arrangements communicating with an intake manifold and an exhaust manifold;
a charge air passageway to the intake manifold;
an exhaust gas passageway that receives exhaust gas from the exhaust manifold;
a turbocharger assembly comprising one or more turbochargers each including:
a compressor to compress charge air and output compressed charge air to the charge air passageway; and
a turbine that receives the exhaust gas from the exhaust gas passageway and drives the compressor in response to the exhaust gas passing through the turbine;
an exhaust qas recirculation (EGR) system that recirculates a portion of the exhaust gas from the exhaust gas passageway back to the intake manifold to mix the portion of the exhaust gas with the compressed charge air, the EGR system including an EGR passageway extending between the exhaust qas passageway and the intake manifold; and
an air pump downstream of the compressor that supplies a portion of the compressed charge air into the exhaust gas passageway upstream of the turbine, such that the turbine receives both the exhaust gas and the portion of the compressed charge air;
wherein the air pump is positioned at an air pump passageway that is separate from the EGR passageway and extends between the charge air passageway and the exhaust gas passageway to bypass the internal combustion engine.

2. The engine system of claim 1, wherein the portion of the compressed charge air supplied by the air pump into the exhaust gas passageway bypasses the internal combustion engine.

3. The engine system of claim 1, wherein the EGR sytem includes an EGR cooler operable to cool the portion of the exhaust gas flowing through the EGR passageway for providing to the intake manifold.

4. The engine system of claim 1, wherein the EGR passageway comprises a cooler passageway having the EGR cooler thereon and a cooler bypass passageway in parallel with the cooler passageway.

5. The engine system of claim 1, further comprising a controller operably connected to the air pump, the controller configured to selectively operate the air pump to control the portion of the compressed charge air supplied into the exhaust gas passageway.

6. The engine system of claim 5, wherein the controller selectively operates the air pump as a function of at least one of engine speed, fuel flow, intake manifold pressure and temperature, exhaust manifold pressure and temperature, or turbocharger speed.

7. The engine system of claim 5, wherein the controller is configured to
monitor a load condition of the internal combustion engine; and
operate the air pump to supply the portion of the compressed charge air into the exhaust gas passageway during steady state operations and the transition of the internal combustion engine from a low load condition to a higher load condition.

8. The engine system of claim 1, further comprising an aftercooler downstream of the compressor, wherein the air pump receives the portion of the compressed charge air after if passes through the aftercooler.

9. The engine system of claim 1, further comprising an aftertreatment system configured to perform one or more of diesel oxidation catalyzation, diesel particulate filtration (DPF) regeneration, or selective catalyst reduction, wherein the portion of the compressed charge air supplied from the air pump into the exhaust gas passageway supports the one of diesel oxidation catalyzation, DPF regeneration, and selective catalyst reduction.

10. The engine system of claim 1, wherein the one or more turbochargers comprises a high-pressure turbocharger and a low-pressure turbocharger;
wherein the turbine of the high-pressure turbocharger receives the exhaust gas from the exhaust gas passageway and the portion of the compressed charge air from the air pump and the compressor of the high-pressure turbocharger outputs the compressed charge air into the charge air passageway; and
wherein the turbine of the low-pressure turbocharger receives an exhaust gas from the turbine of the high-pressure turbocharger and the compressor of the low-pressure turbocharger delivers intake air to the compressor of the high-pressure turbocharger.

11. A method of manufacturing an engine system, the method comprising:
- providing an internal combustion engine operable to cause combustion within one or more piston-cylinder arrangements in an engine block of the internal combustion engine;
- providing an exhaust manifold and an exhaust gas passageway that direct exhaust gas from the one or more piston-cylinder arrangements to a turbocharger assembly of the engine system, the turbocharger assembly including one or more turbochargers each having a turbine that drives a compressor to output a compressed charge air;
- providing a charge air passageway to receive the compressed charge air and communicate the compressed charge air to an intake manifold of the internal combustion engine;
- providing an exhaust gas recirculation (EGR) system that recirculates a portion of the exhaust gas from the exhaust gas passageway back to the intake manifold to mix the portion of the exhaust gas with the compressed charge air, the EGR system including an EGR passageway extending between the exhaust gas passageway and the intake manifold; and
- providing an air pump operable to supply a portion of the compressed charge air into the exhaust gas passageway upstream of the turbocharger assembly, such that both the exhaust gas and the portion of the compressed charge air are passed through the turbine of each of the one or more turbochargers to drive operation thereof;
- wherein the air pump is positioned at an air pump passageway that is separate from the EGR passageway and extends between the charge air passageway and the exhaust gas passageway to bypass the internal combustion engine.

12. The method of claim 11, comprising providing a controller configured to selectively operate the air pump based on one or more monitored operating parameters of the engine system, the one or more operating parameters comprising engine speed, fuel flow, intake manifold pressure and temperature, exhaust manifold pressure and temperature, or turbocharger speed.

* * * * *

UNITED STATES PATENT AND TRADEMARK OFFICE
CERTIFICATE OF CORRECTION

PATENT NO. : 11,591,992 B2
APPLICATION NO. : 17/308331
DATED : February 28, 2023
INVENTOR(S) : Haaland et al.

It is certified that error appears in the above-identified patent and that said Letters Patent is hereby corrected as shown below:

On the Title Page

On Page 2, in Item (56), in Column 2, under "FOREIGN PATENT DOCUMENTS" Line 4, for ref. DE 102015208418 A1, delete "10/2016" and insert -- 11/2016 --, therefor.

On Page 2, in Item (56), in Column 2, under "FOREIGN PATENT DOCUMENTS" Line 14, for ref. GB 804124, after "GB 804124" insert -- A --.

On Page 2, in Item (56), in Column 2, under "FOREIGN PATENT DOCUMENTS" Line 15, for ref. JP 09268916 A1, delete "A1" and insert -- A --, therefor.

On Page 2, in Item (56), in Column 2, under "FOREIGN PATENT DOCUMENTS" Line 16, for ref. JP 2001073880 A1, delete "A1" and insert -- A --, therefor.

In the Claims

In Column 15, Line 64, Claim 1, delete "qas" and insert -- gas --, therefor.

In Column 16, Line 2, Claim 1, delete "qas" and insert -- gas --, therefor.

In Column 16, Line 18, Claim 3, delete "sytem" and insert -- system --, therefor.

Signed and Sealed this
Eighteenth Day of July, 2023

Katherine Kelly Vidal
*Director of the United States Patent and Trademark Office*